United States Patent [19]

Peoples

[11] 4,087,657
[45] May 2, 1978

[54] TESTING OF INDUCTIVELY LOADED TRANSMISSION LINES FOR CORRECT LOADING

[75] Inventor: John Terrance Peoples, Berkeley Heights, N.J.

[73] Assignee: Bell Telephone Laboratories, Incorporated, Murray Hill, N.J.

[21] Appl. No.: 787,847

[22] Filed: Apr. 15, 1977

[51] Int. Cl.² .............................................. H04B 3/46
[52] U.S. Cl. ........................ 179/175.3 R; 324/57 SS; 324/60 R
[58] Field of Search .......... 179/175.3 R, 175, 175.3 F; 324/57 SS, 59, 60 R

[56] References Cited

U.S. PATENT DOCUMENTS

| 3,711,771 | 1/1973 | Hume et al. | 324/57 SS |
| 3,904,839 | 9/1975 | Peoples | 179/175.3 F |

OTHER PUBLICATIONS

Brochure on Model T195 by Wilcom Products, Inc.
*Introduction to Modern Network Synthesis*, by Van Valkenburg, 1960, pp. 126–131.

Primary Examiner—Douglas W. Olms
Attorney, Agent, or Firm—H. L. Logan

[57] ABSTRACT

Equipment and methods are disclosed for testing inductively loaded telephone lines for loading irregularities. In brief, immittance phase measurements are used to determine the approximate frequencies of the poles and zeros of such a line and then a lossless ladder network comprising series inductors and shunt capacitors is synthesized wherein the pole and zero frequencies of the network are substantially equal to those previously determined. The network inductor values relate to the line loading inductor values while the network capacitor values relate to the distances between the loading inductors.

6 Claims, 14 Drawing Figures

SYNTHESIZED LINE CIRCUIT

—— PHASE DIFFERENCE IN RADIANS X $10^{-5}$
---- MAGNITUDE IN OHMS

—— PHASE DIFFERENCE IN RADIANS X $10^{-5}$
----- MAGNITUDE IN OHMS

—— PHASE DIFFERENCE IN RADIANS X $10^{-5}$
---- MAGNITUDE IN OHMS

——— PHASE DIFFERENCE IN RADIANS X $10^{-5}$
------ MAGNITUDE IN OHMS

TESTING OF INDUCTIVELY LOADED TRANSMISSION LINES FOR CORRECT LOADING

BACKGROUND OF THE INVENTION

1. Field of the Invention

This invention relates to the testing of inductively loaded transmission lines to identify incorrect loading on such lines.

2. Description of the Prior Art

Insertion of load coils at regular intervals greatly improves the voice-transmitting properties of long twisted-pair cables. The most common loading arrangement in telephone systems places 88 millihenry load coils every 6,000 feet on loops longer than 18,000 feet. Using this arrangement as a basis, there are over five million loaded telephone loops and at least several million loaded trunk facilities in the continental United States.

Faulty loading caused by missing or excessive load coils, incorrect spacing of coils, or damaged coils can cause voice transmission to be poorer than if the loop were correctly loaded and in some cases poorer than if the loop were not loaded. The prior art discloses test equipment for identifying such faulty loading. A typical piece of prior art test equipment includes a cathode ray tube for displaying a pattern representing, as a function of frequency, the impedance characteristic of a line under test. At the same time, the tube displays a second pattern which represents, as a function of frequency, the impedance characteristic of a lattice network. This network is made up by the test equipment operator from a kit to cause the second pattern to approximate that of the line under test. When a good match between the two patterns is achieved, then the configuration and values of the network elements are indicative of the composition of the line under test.

Although the above-described equipment has been used successfully, it has been found that producing a reasonable match of patterns is time consuming and somewhat of an art. Equipment which produces rapid results with relatively inexperienced operators would permit better overall telephone service.

Apparatus and methods which permit incorrect line loading to be identified by relatively inexperienced operators are disclosed in U.S. patent application Ser. No. 787,852, filed on even date herewith by F. D. Blum, D. L. Hester and J. T. Peoples. In accordance with the disclosure in that application, immittance magnitudes as a function of frequency of the input immittance of a line under test are produced. The frequencies at which local maximum and minimum values occur in the magnitudes are detected and a ladder network comprising series connected inductors and shunt connected capacitors is then synthesized wherein the pole and zero frequencies of the network approximate in value those previously detected. The values of the inductors and capacitors of the synthesized network represent the values of the loading inductors and the line spacing between the inductors, respectively.

SUMMARY OF THE INVENTION

An object of the present invention is to reduce the skill and time required to identify the parameters of an inductively loaded transmission line.

In accordance with the present invention, the differential phase of the input immittance of a transmission line is obtained and utilized to approximate the frequencies of the poles and zeros of the immittance. A lossless ladder network comprising series inductors and shunt capacitors is then synthesized with the pole and zero frequencies of the network being substantially equal to those produced with respect to the input immittance of the line. The network inductors are viewed as corresponding to the line inductors while the network capacitors are viewed as related to line spacings between line inductors.

Embodiments of the invention include structure which rapidly approximates the line immittance poles and zeros and, furthermore, rapidly synthesizes a ladder network with the resulting capacitor and inductor values being produced on a read-out device. This structure may be readily adapted to give a read-out in the form of line spacings instead of capacitor values by inputting data relative to the capacitance characteristic of the line under test. As a consequence, embodiments of the invention may be utilized by relatively unskilled personnel to quickly obtain data on a loaded line.

The data produced by practicing the invention relates to the line under test in an approximate manner because the frequencies produced are only approximations of the true pole and zero frequencies. However, the data is always sufficiently close to identify correctly loaded lines and, furthermore, sufficiently close to identify most types of problems in incorrectly loaded lines. There are cases, however, where incorrectly loaded lines will have zero and pole frequencies so related with respect to one another that an incorrect diagnosis will result. Fortunately, such cases seldom occur and the invention may therefore be advantageously employed.

As stated above and discussed in detail hereinafter, the present invention acquires pole and zero frequency information by utilizing input immittance magnitude information. Structure for acquiring frequency information by this approach is more complicated than the structure required for acquiring similar information by the magnitude approach taught by F. D. Blum et al. in the above referenced patent application. However, the present invention, as contrasted with the Blum et al. invention, is useful for diagnosing longer lines and, in general, a greater percentage of loaded line cases.

BRIEF DESCRIPTION OF THE DRAWINGS

In the drawings:

FIGS. 7A and 7B through FIGS. 10A and 10B show examples of line conditions which may be diagnosed through the use of the present invention.

DETAILED DESCRIPTION

Figure 1:
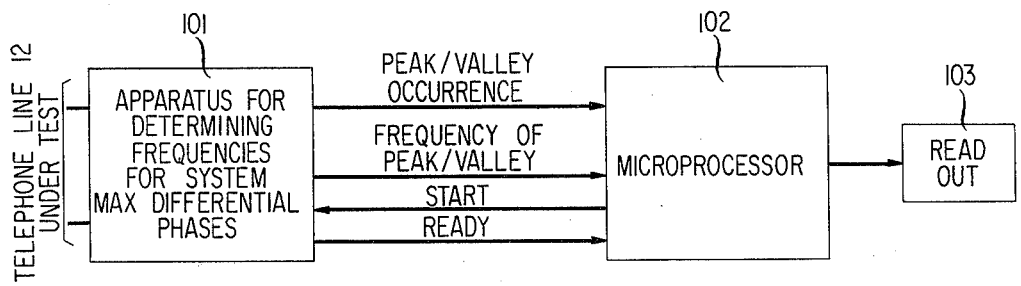
FIG. 1 is a block diagram of one embodiment of the invention.

The embodiment of the invention disclosed in FIG. 1 comprises an apparatus 101 for determining the frequencies for maximum phase differentials of system immittance; i.e., for determining the frequencies at which peaks occur in the change of the phase of system immittance with respect to frequency as a monotonic function of frequency. The embodiment further comprises a microprocessor 102 connected to apparatus 101 and a readout device 103 connected to microprocessor 102.

Apparatus 101 has an input port for connection to the tip and ring leads of a telephone line 12 which is to be tested. Apparatus 101 has a further input port for securing a START input from microprocessor 102 and three output ports for indicating the time occurrences of peaks and valleys in the measured impedances, the frequencies at which these peaks and valleys occur and, finally, the termination of the operation of apparatus 101.

Figure 2:
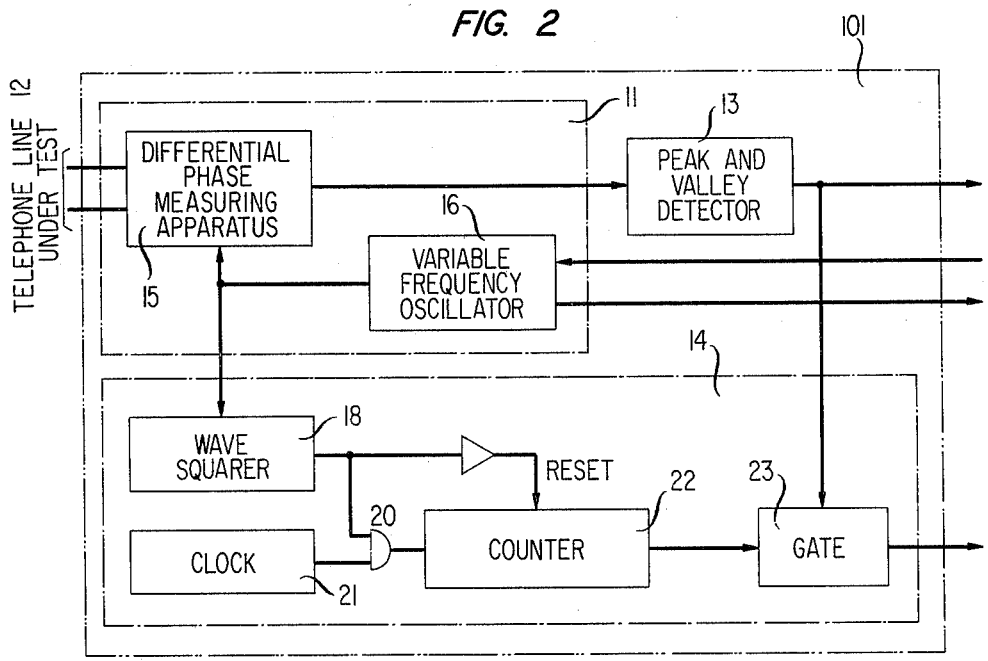
FIGS. 2 through 4 disclose structure that may be used in the embodiment of FIG. 1.

Apparatus 101 of FIG. 1 may take the form of that disclosed in FIG. 2 hereof. The apparatus depicted by FIG. 2 comprises apparatus 11 connected to telephone line 12 to produce, as a function of frequency, an output directly related to the differential phase of the immittance of line 12. This output in turn is applied to a peak and valley detector 13. Finally, a frequency identifying circuit 14 is connected between apparatus 11 and detector 13, to produce indications of the frequencies at which the peaks and valleys occur.

Apparatus 11 comprises a differential phase measuring apparatus 15 which may take the form of the structure disclosed in U.S. Pat. No. 3,904,839, issued to J. T. Peoples on Sept. 9, 1975 and reproduced in FIG. 3 hereof. When using such structure, the output of apparatus 15 is a waveform proportional to the derivative with respect to frequency of the input immittance phase angle.

Peak and valley detector 13 may take the form of the structure disclosed in R. S. Hoppough's copending application Ser. No. 787,848 filed on even date herewith and reproduced in FIG. 4 hereof. That structure comprises an operational amplifier with a bidirectional nonlinear feedback circuit and a capacitor between its inverting input and ground. The nonlinear feedback circuit is nonconductive until voltages of either polarity thereacross exceed a threshold level. The capacitor is charged and discharged by feedback path current whose polarity and magnitude are dictated by the slope of a signal applied to the noninverting input terminal of the operational amplifier. The feedback path current results in a voltage being developed across the feedback path. This voltage is amplified and clipped so as to shift between two levels depending on the polarity of the current, which as mentioned earlier, is dictated by the slope of the signal applied to the operational amplifier noninverting input terminal. When, therefore, an input signal of variable amplitude is applied to the noninverting input terminal, an output signal is produced which shifts between two levels in response to each reversal in the slope of the input signal. The transition between these two levels is extracted by a high-pass filter to indicate peaks and valleys in the input signal.

Frequency identifying circuit 14 comprises a wave squarer 18 which produces square waves in response to the sinusoidal output of oscillator 16. The output from wave squarer 18 is applied to both an inverter 19 and an AND gate 20. The output from a clock 21 is also applied to AND gate 20. Positive outputs from wave squarer 18 enable AND gate 20 so that pulse outputs from clock 21 are passed to and counted in a counter 22. The negative output of squarer 18 is inverted by inverter 19 and applied to counter 22 to reset it. The maximum count produced each time by counter 22 is therefore representative of the period of the positive output of squarer 18, which of course is inversely related to the immediate frequency of oscillator 16. A gate 23 is connected to both detector 13 and counter 22 and passes the output of counter 22 when peaks and valleys are detected by detector 13. Outputs thus produced represent the frequencies at which the maximum and minimum values of admittance occur for line 12.

Figure 3:
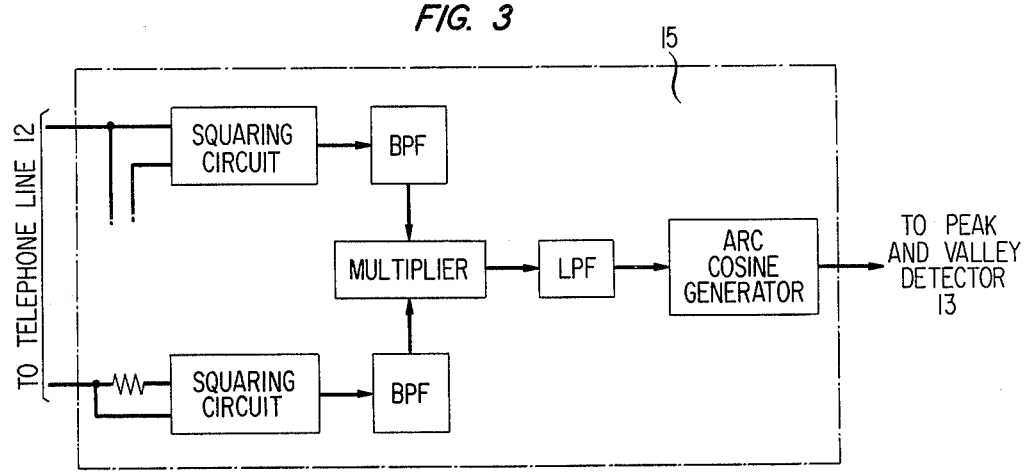
Figure 4:
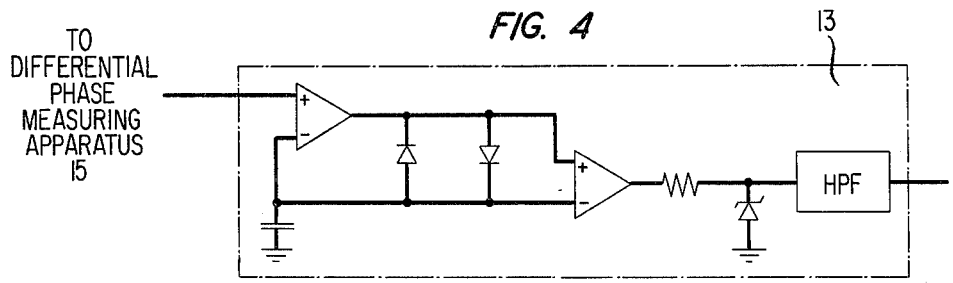

When using apparatus 15 of FIG. 3, and detector 13 of FIG. 4, detector 13 produces negative pulses for peaks (local maximum values) and positive pulses for valleys (local minimum values) in the output of apparatus 15. Gate 23 may then comprise a pair of gates connected in parallel to counter 22 and responsive to the negative and positive pulses, respectively. One of the gates therefore produces frequency information for peaks while the other produces such information for valleys. (As appreciated by those skilled in the art, other configurations may be employed to correlate peak and valley pulses and the output of counter 22.) Peak-produced frequency information is related to the "zeros" of line 12 while valley-produced frequency information is related to the "poles" of line 12. (The opposite relationship exists when using impedance measuring apparatus.) Peak and valley frequency information is of course produced in an alternating order as there must always be a valley between a pair of peaks and a peak between a pair of valleys.

As mentioned earlier, use of the present invention permits diagnoses of faulty loaded lines which cannot be diagnosed by the use of the F. D. Blum et al. invention. FIGS. 7A and 7B, through FIGS. 10A and 10B are computer synthesized examples of some of these cases.

Figure 7A:
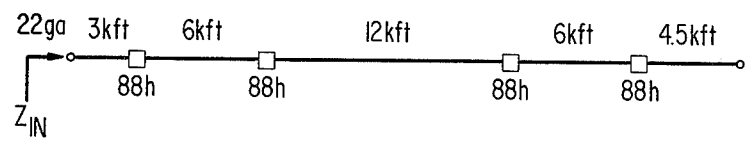
Figure 7B:
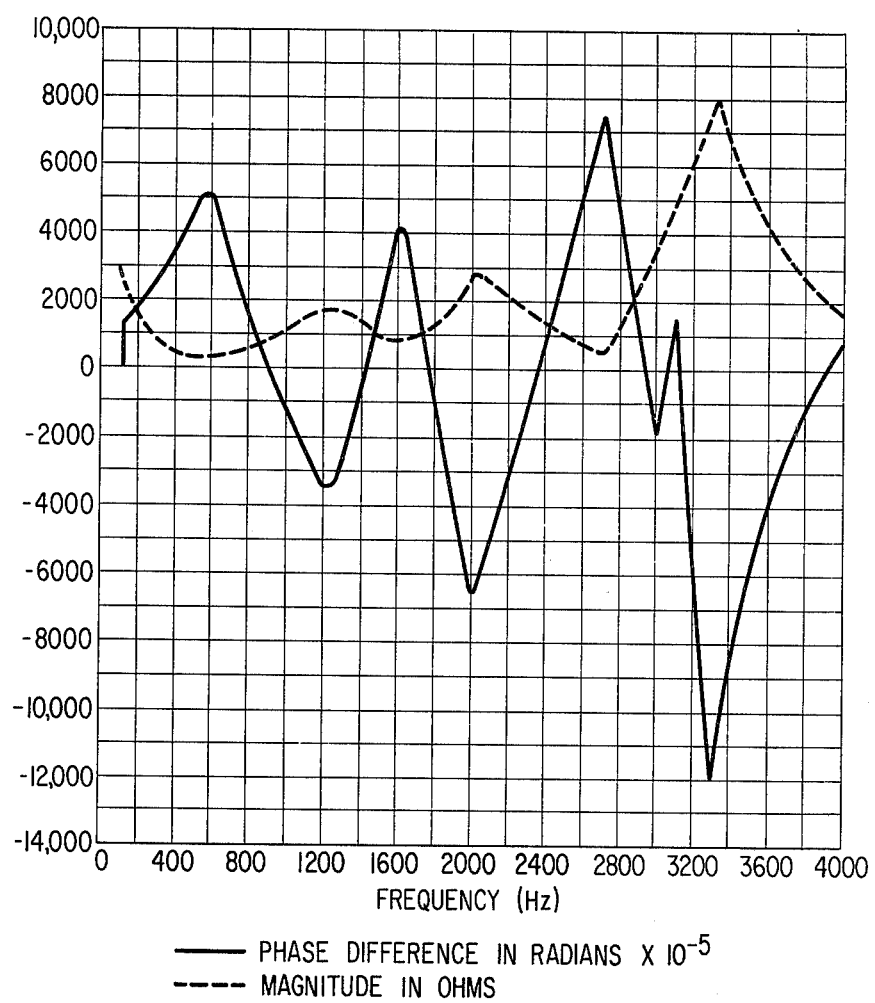

In FIG. 7A, the line should have five loading coils but the third (from the input end) coil is missing so that there is a long midsection. This is the only problem with this line. FIG. 7B shows the impedance magnitude vs. frequency output and the phase differential output for this line. The magnitude output has three peaks and three valleys, thus indicating three zero frequencies and three pole frequencies. A first Cauer network synthesized from this output would therefore only have three coils and would consequently not represent the true situation. The phase differential output, on the other hand, has four peaks and four valleys, thus indicating four zero frequencies and four pole frequencies. A first Cauer network synthesized from this output would therefore have four coils and five capacitors which would represent the line of FIG. 7A.

Figure 8A:
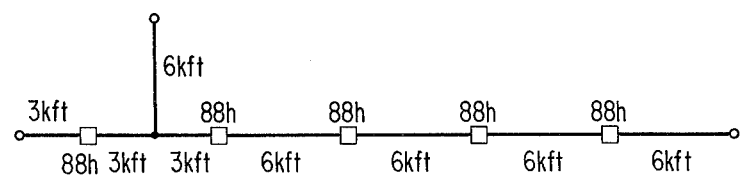
Figure 8B:
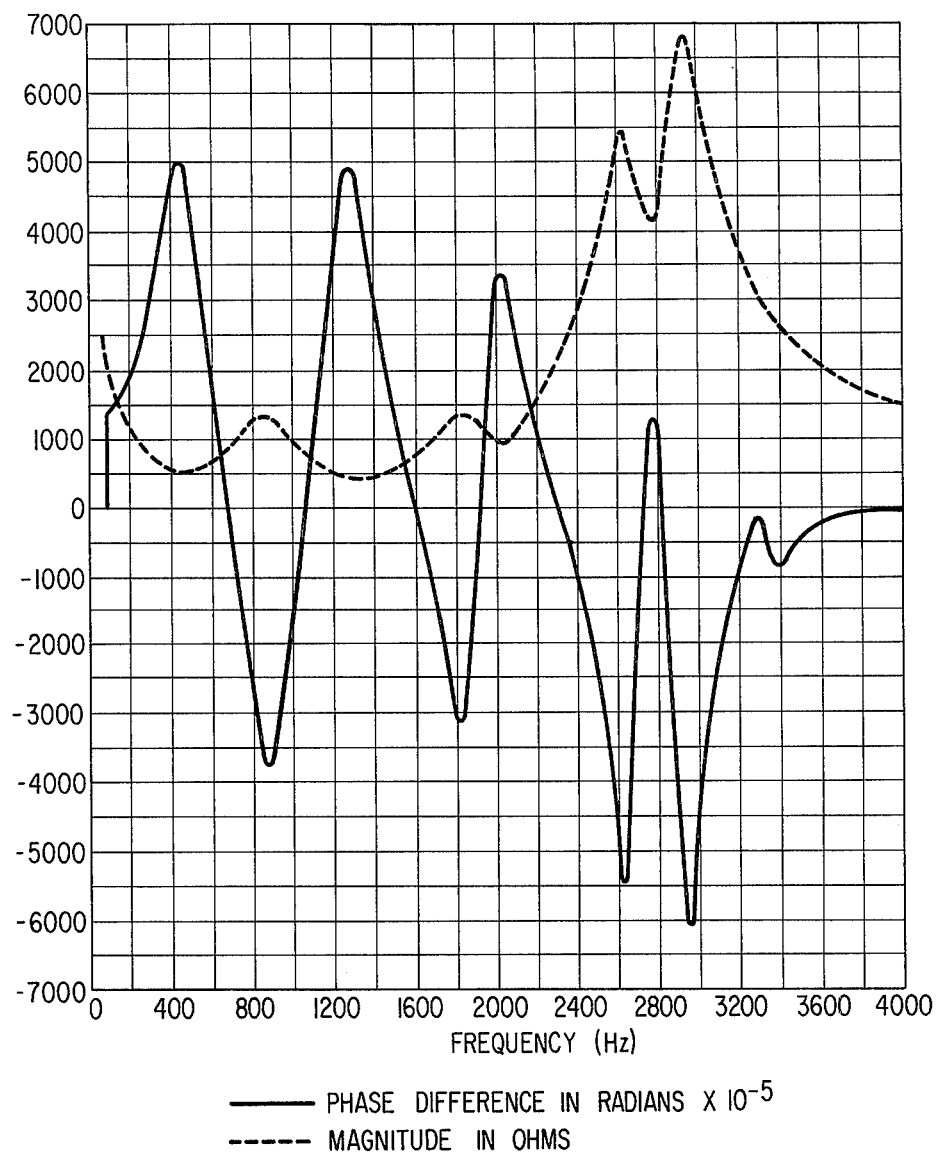

The example in FIG. 8A is a correctly loaded five-coil line which has a bridged tap connected between the first and second coils. The magnitude output has only four peaks and four valleys while the differential phase output has five peaks and five valleys. Synthesis using the former outputs will result in an incorrect first Cauer network while synthesis using the latter output will result in the correct first Cauer network.

Figure 9A:
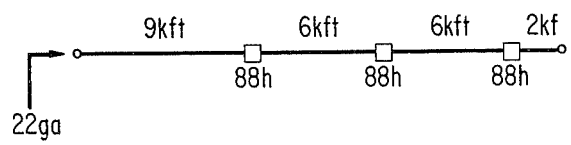
Figure 9B:
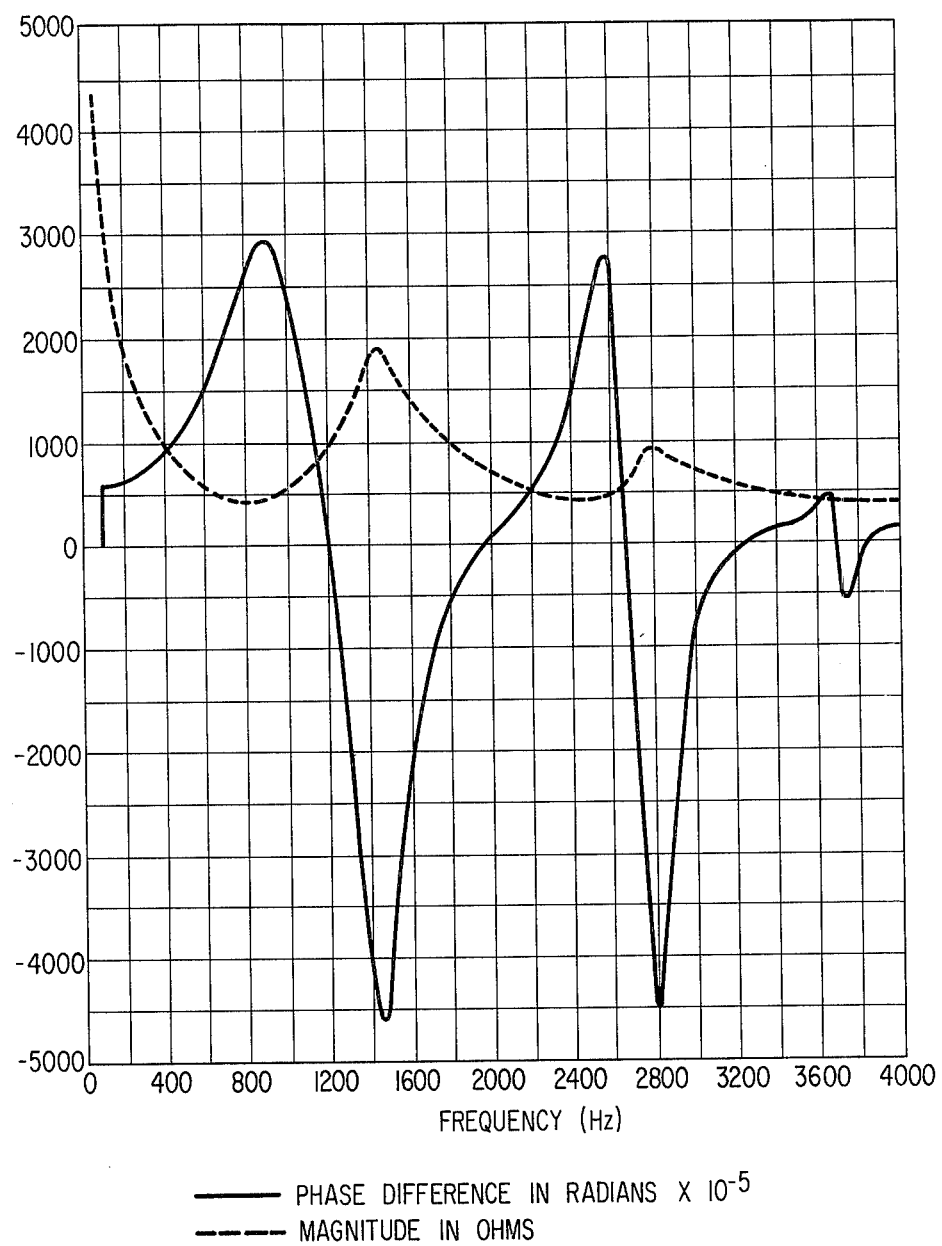

Two problems exist in the line shown in FIG. 9A. In particular, it has a "long" near end section and a "short" far end section. For good transmission, the near end section should be approximately 3 kilofeet while the far end section should be between 3 and 6 kilofeet. (A coil is obviously missing from the near end section.) The magnitude output has two peaks and two valleys while the differential output has three peaks and valleys. A true representation of the line of FIG. 9A is synthesizable only from the latter output.

Figure 10A:
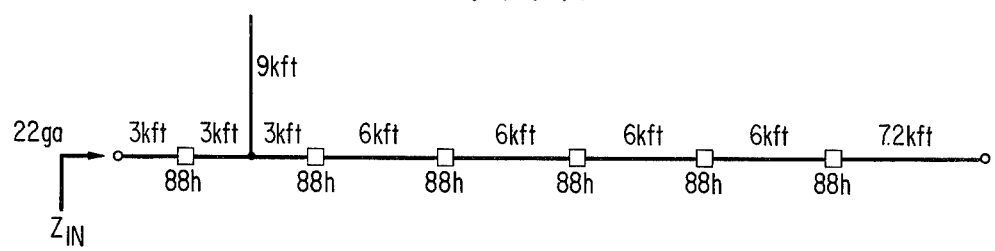
Figure 10B:
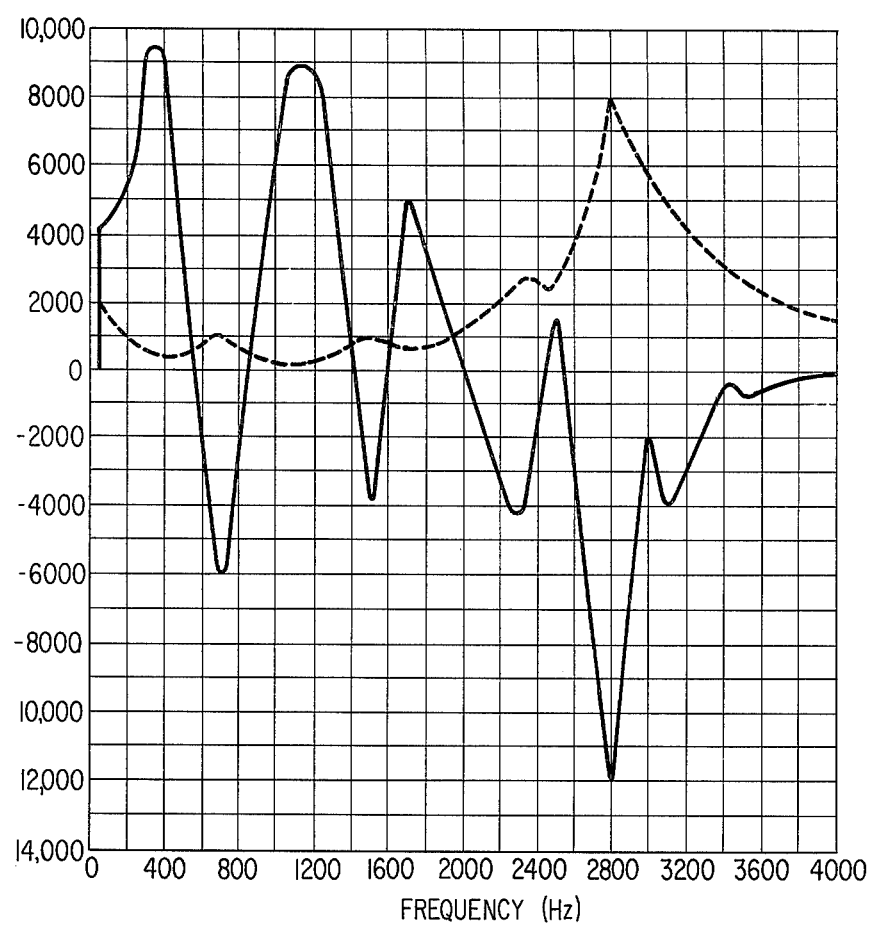

The last example shown in FIG. 10A has six correctly-spaced load coils, a bridged tap connected between its first and second coils and a "long" far end section. At best, the magnitude output would indicate four peaks and four valleys; the blip at about 2.4–2.5 kHz would probably be missed by the peak and valley detector so that only three peak and three valley frequencies would be indicated. A first Cauer network synthesized from this data would not even remotely represent this line. The differential phase output, on the other hand, has six peaks and six valleys which should be readialy recognized by the peak and valley detector so that a first Cauer network representing the line may be synthesized.

Referring back to FIG. 1, microprocessor 102 receives counter output information relating to frequencies and also peak and valley occurrence information for labeling the counter output as either a peak or valley frequency. This procedure is repeated each time a peak or valley is detected. When the frequency sweep is completed, a signal on the READY lead signals microprocessor 102 that the data collecting process is completed and that the process of synthesizing a first Cauer network may begin. These two processes are discussed in detail in the following sections (a) and (b):

(a) Numerical Format of the Peak and Valley Frequencies

After the frequency sweep is completed, microprocessor 102 has stored in its read/write memory a string of data words, one for each peak or valley. In one embodiment in which an 8080 type of microprocessor is used, each data word contains a 14-bit binary count representing the number of clock cycles (from clock 21) in a half cycle of variable frequency oscillator (VCO) 16 output. With a 4-MHz clock, the maximum and minimum VCO frequencies give the counts shown in Table 1. From the table, it can be seen that when the lower-order bit is omitted, the remaining 13 bits give an adequate representation of the frequencies of interest with a quantizing error of 16 Hz at the 4,000-Hz limit, or a 0.4% error.

TABLE 1
COUNTER OUTPUT FOR VCO FREQUENCIES.

| VCO Frequency (Hz) | f(clock) = 4 MHz, Count = f(clock)/2×f(VCO) | |
|---|---|---|
|  | Count (Decimal) | Count (14-bit binary) |
| 200 | 10,000 | 10 0111 0001 0000 |
| 3,984 | 502 | 00 0001 1111 0110 |
| 4,000 | 500 | 00 0001 1111 0100 |

From the preceding paragraph, it can be seen that the frequencies are obtained by dividing the 14-bit count into another binary constant representing clock frequency. In practice, this calculation and subsequent calculations are made by first converting the numbers to a 32-bit floating point representation having a 24-bit mantissa and an 8-bit exponent. This precision is not needed to calculate peak or valley frequencies, but is necessary for the numerical network synthesis procedure described below.

(b) Synthesizing the LC Ladder Network

Figure 5:
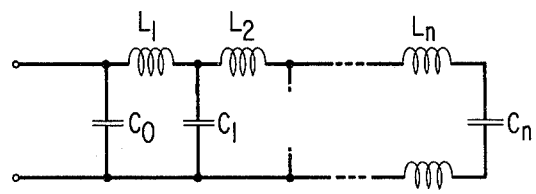
FIG. 5 is a schematic drawing of a first Cauer network.

The desired LC ladder network has the form shown in FIG. 5, which is the classical first Cauer ladder network (see, for example, "Introduction to Modern Network Synthesis," by M. E. Van Valkenburg, J. Wiley & Sons 1960, pages 128-131) having an input impedance $$Z_{in}(s) = K \frac{(s^2 - z_1^2)(s^2 - z_2^2)\ldots(s^2 - z_n^2)}{s(s^2 - p_1^2)(s^2 - p_2^2)\ldots(s^2 - p_n^2)}, \quad (1)$$

where:
- $n$ is the number of load coils,
- $s$ is the imaginary operator $j$ times the radian frequency,
- $K$ is a scale factor, and
- $z_1$ through $z_n$ and $p_1$ through $p_n$ are the zero and pole frequencies in radians per second.

An actual telephone loop cannot, of course, be represented exactly by a lumped, lossless network function of this form, but this simplified model is adequate for locating most loading irregularities.

Multiplying the roots in (1) to form polynomials in $s$, and then inverting gives $$Y_{in}(s) = 1/Z_{in}(s) = K \frac{s^{2n+1} + a_{2n-1}s^{2n-1} + \ldots a_1 s^1}{s^{2n} + b_{2n-2}s^{2n-2} + \ldots + b_0 s^0}. \quad (2)$$

A first-Cauer synthesis of the ladder network of FIG. 5 from equation (2) is straightforward, and is explained in the above-cited text. As an example and to demonstrate the operation of microprocessor 102, synthesis of a two load coil example is carried out below using normalized variables, denoted by an underbar, and using frequency in Hertz. The numerical results labeled $C_0, C_1, L_1$, etc. refer directly to the element values in FIG. 5.

Measured zeros = 1.08 kHz, 2.83 kHz
Measured poles = 2.05 kHz, 3.32 kHz $$Z = \frac{[f^2 + (1.08)^2][f^2 + (2.83)^2]}{f[f^2 + (2.05)^2][f^2 + (3.32)^2]} = \frac{f^4 + 9.1753f^2 + 9.341581}{f^5 + 15.2249f^3 + 46.321636f}$$

$$\begin{array}{r} 1.0f \\ f^4 + 9.1753f^2 + 9.341581 \overline{)f^5 + 15.2249f^3 + 46.321636f} \\ \underline{f^5 + 9.1753f^3 + 9.341581f} \\ 6.0496f^3 + 36.980055f \end{array}$$

$C_0 = 1.0$ $$\begin{array}{r} .16530019f \\ 6.0496f^3 + 36.980055f \overline{)f^4 + 9.1753f^2 + 9.341581} \\ \underline{f^4 + 6.11281f^2} \\ 3.0624901f^2 + 9.341581 \end{array}$$

$L_1 = .16530019$ $$\begin{array}{r} 1.975386f \\ 3.0624901f^2 + 9.341581 \overline{)6.0496f^3 + 36.980055f} \\ \underline{6.0496f^3 + 18.453228f} \\ 18.526827f \end{array}$$

$C_1 = 1.975386$ $$\begin{array}{r} .1653003f \\ 18.526827f \overline{)3.062490f^2 + 9.341581} \\ \underline{3.062490f^2} \\ 9.341581 \end{array}$$

$L_2 = .1653003$ $$\begin{array}{r} 1.9832646f \\ 9.341581 \overline{)18.526827f} \end{array}$$

$C_2 = 1.9832646$

One additional piece of data is required to determine element values; that is, to denormalize. A number of procedures are possible; one that has been successfully is to assume that the first load coil is exactly what it should be, as, for example, 88 millihenries. This assumption is a good one for two reasons. First, the load coils are within a few millihenries of their assumed values if they are present, and, secondly, using this known fact avoids having to take additional data such as measuring the magnitude of admittance at a frequency that is not a pole or zero. The latter procedure is to be avoided if at all possible since no magnitude measuring circuits are required otherwise.

Denormalization of the element values in the above example by assuming the first load coil is exactly 88 mH is carried out below:

| NORMALIZED | DENORMALIZED |
|---|---|
| $L_1 = .16530019 \times \frac{88.0}{L_1}$ | $L_1 = 88.0$ mH |
| $L_2 = .1653003 \times \frac{88.0}{L_1}$ | $L_2 = 88.0$ mH |
| $C_0 = 1.0 \times \frac{L_1}{88} \times \left[\frac{1}{2\pi}\right]^2 \times \frac{10^3}{.01572}$ | $C_0 = 3.026$ K feet |
| $C_1 = 1.975386 \times \frac{L_1}{88} \times \left[\frac{1}{2\pi}\right]^2 \times \frac{10^3}{.01572}$ | $C_1 = 5.979$ K feet |
| $C_2 = 1.9832646 \times \frac{L_1}{88} \times \left[\frac{1}{2\pi}\right]^2 \times \frac{10^3}{.01572}$ | $C_2 = 6.003$ K feet |

Figure 6:
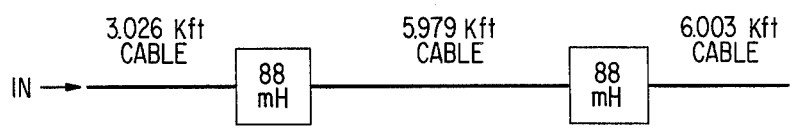
FIG. 6 shows a line circuit synthesized in accordance with the invention.

The synthesized network is shown in FIG. 6. Note that a two load coil LC ladder is obtained with cable lengths of 3.026, 5.979, and 6.003 K feet. The conversion from microfarads to kilofeet of cable was accomplished by assuming a cable capacitance of 0.01572 $\mu$F per K feet (0.083 $\mu$F per mile).

In the disclosed embodiment, a microprocessor is disclosed for synthesizing the ladder network. It should be understood that embodiments of the invention are not restricted to the use of microprocessors but instead can be constructed utilizing any apparatus which can perform the synthesizing function.

What is claimed is:

1. Test apparatus for use with inductively loaded transmission lines to approximate the values of both the loading inductors and distances between said inductors, said apparatus comprising
    apparatus for measuring the immittance phase differentials of the input immittance of a loaded transmission line and for utilizing said differentials to produce outputs indicating the approximate frequencies of the poles and zeros of said line, and
    means responsive to the frequency information output of said apparatus to synthesize a ladder network comprising series connected inductors and shunt connected capacitors where the pole and zero frequencies of said network approximate in value those identified by said apparatus and, furthermore, to produce outputs indicative of the values of said inductors and capacitors of said synthesized network.

2. Equipment in accordance with claim 1 in which said apparatus comprises:
    a transducer for producing a signal proportional to the change of the phase of the input immittance of said line as a function of frequency, and
    a detector connected to said transducer for identifying the frequencies at which local maximum and minimum values occur in the output signal of said transducer.

3. Equipment in accordance with claim 1 in which said means synthesizes a first Cauer network in response to output frequencies from said detector.

4. Equipment in accordance with claim 2 in which said means comprises a preprogrammed microprocessor.

5. Equipment in accordance with claim 3 in which said means comprises a preprogrammed microprocessor.

6. A method for approximating a loaded transmission line comprising the steps of:
    measuring the phase change as a function of frequency of the input immittance of a loaded transmission line,
    determining the approximate pole and zero frequencies of said line by detecting the frequencies at which said phase changes have local maximum and minimum values, and
    synthesizing a ladder network comprising series connected inductors and shunt connected capacitors where the pole and zero frequencies of said network are substantially equal to those frequencies determined in the previous step.

* * * * *